(12) United States Patent
Willman (10) Patent No.: US 12,498,136 B2
(45) Date of Patent: *Dec. 16, 2025

(54) COMPUTER ENABLED SYSTEM FOR ASSESSING OPTIMUM AIRFLOW FOR MEDICAL FACILITIES AND SECURE ROOMS AND OFFICES

(71) Applicant: Alexander J. Willman, Carlsbad, CA (US)

(72) Inventor: Alexander J. Willman, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/951,538

(22) Filed: Nov. 18, 2024

(65) Prior Publication Data

US 2025/0075930 A1   Mar. 6, 2025

Related U.S. Application Data

(63) Continuation-in-part of application No. 18/430,405, filed on Feb. 1, 2024, now Pat. No. 12,146,674.

(60) Provisional application No. 63/442,874, filed on Feb. 2, 2023.

(51) Int. Cl.
*F24F 11/63*   (2018.01)
*G05B 17/02*   (2006.01)
*G06F 30/28*   (2020.01)

(52) U.S. Cl.
CPC .............. *F24F 11/63* (2018.01); *G05B 17/02* (2013.01); *G06F 30/28* (2020.01)

(58) Field of Classification Search
None
See application file for complete search history.

(56) References Cited

U.S. PATENT DOCUMENTS

| | | | | |
|---|---|---|---|---|
| 2016/0258645 | A1* | 9/2016 | Boufounos | G05B 13/04 |
| 2021/0262682 | A1* | 8/2021 | Nabi | G05B 19/042 |
| 2022/0034542 | A1* | 2/2022 | Peters | F24F 11/0001 |
| 2023/0324064 | A1* | 10/2023 | Garbey | A61P 11/00 700/276 |
| 2024/0093895 | A1* | 3/2024 | Kilpack | F24F 11/46 |

* cited by examiner

*Primary Examiner* — David Earl Ogg
(74) *Attorney, Agent, or Firm* — Donn K. Harms (57) ABSTRACT

A computer and software enabled system is provided for real time and ongoing assessment and adjustment of current air quality and airflow within and exiting a room, such as an operating room or SCIF. Using software operating to the task of assessing existing airflow patterns in rooms and to determine from an optimal CFD model and a real time current CFD model one or more adjustments of the characteristics of incoming and outgoing airflow, to substantially match current air flows to that of the optimal CFD model.

16 Claims, 7 Drawing Sheets

COMPUTER ENABLED SYSTEM FOR ASSESSING OPTIMUM AIRFLOW FOR MEDICAL FACILITIES AND SECURE ROOMS AND OFFICES

This application is a Continuation in Part Application which claims priority to U.S. Patent application Ser. No. 18/430,405 filed on Feb. 1, 2024, which claims priority to U.S. Provisional Patent application Ser. No. 63/442,874 filed on Feb. 2, 2023.

BACKGROUND OF THE INVENTION

1. Field of the Invention

The invention herein disclosed relates generally to the field of airflow in medical facilities and secured rooms and offices. More particularly, it relates to a system employing software running on a computer accessible over a network which operates to assess airflow within confined areas of a medical facility, such as operating rooms, or compartmentalized rooms to facilitate airflow which minimizes the impact of airborne pathogens and particulate upon personnel and patients occupying the area.

2. Prior Art

In modern medical facilities, great care is taken to minimize the potential of harm or illness to the occupants of the facility from air which is breathed by persons within the facility. This is especially true in very confined spaces of medical facilities where medical professionals and especially patients therein are at increased risk, such as operating rooms.

As a consequence, significant effort has been exercised in recent years to provide airflow within operating rooms which will minimize exposure and the potential of infection of the surgical site from potential infection due to exposure to airborne pathogens and particulate. Additional concurrent efforts have been taken to also provide medical personnel, surgeons, and other medical providers in the operating room with a comfortable environment in which to work, as well as to minimize their potential exposure to airborne pathogens, such as bacteria, viruses, and contaminating particulate in the air.

It has been found that, where operating room temperatures are too high, potential pathogens and microorganisms present in the operating room tend to grow. Further, when operating room humidity is too high, condensation tends to form on the ceilings and medical equipment which can have serious consequences in the form of water droplets falling upon patients or instruments. Still further, should either the temperature or the humidity rise to higher levels, there is potential for surgeons to perspire which increases the potential for such perspiration to fall into the sterile field.

As a consequence, the Center for Disease Control has recommended that operating room ventilation systems be capable of forming directed incoming airflow and exhausting airflow which provide the recommended changes of the room air over time, as well as filtration thereof. These determined room air changes and directed flowpaths of operating room air are intended to minimize the potential of pathogen communication to the sterile field of the operation on the patient. The filtration of the air during also serves to minimize such pathogens or particulate being communicated to the patient and to the sterile field of the operation. Concurrently, such ventilation systems conventionally operate to maintain the temperature in the room between 68-73 degrees Fahrenheit with a humidity level between 30-60 percent.

Still further, such ventilation systems conventionally operate to impart a positive pressure to the air within the operating room relative to the air pressure outside the operating room. Such positive air pressure insures that particulate, pathogens, and other air-carried unwanted components are maintained outside the operating room by exiting air under such positive pressure upon the opening of a door or other passage running between the operating room and the exterior thereof.

With respect to the above, before explaining at least one preferred embodiment of the system herein enabling real time assessment of room airflow characteristics, and the results yielded by input modifications thereto, it is to be understood that the system herein is not limited in its application to the details of employment and to the arrangement of the components or the steps set forth in the following description or illustrated in the drawings. The various software-enable methods and steps of the herein disclosed airflow assessment invention is capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other other operating room and medical facility airflow assessment systems. It is important, therefore, that the embodiments, objects and claims herein, be regarded as including such equivalent construction and methodology insofar as they do not depart from the spirit and scope of the present invention.

SUMMARY OF THE INVENTION

The disclosed system herein provides for the real time and ongoing assessment and adjustment of current air quality and airflow within and exiting an operating room, or through other enclosed spaces requiring highly specific air quality such as a portable medical facility or operating room such as used by the military, and portable offices such as a Sensitive Compartmented Information Facility (SCIF). Conventionally, such operating rooms and enclosed spaces and rooms require the heating, ventilation, and air conditioning (HVAC) to maintain a positive air pressure and a preset determined air temperature and humidity range within the operating room. There are additional air quality requirements, in many cases, as to particulates and pathogens in the air Conventionally, such HVAC systems operate under preset parameters to maintain the operating room at a temperature and humidity level which the surgical staff deems comfortable to allow them to concentrate upon the patient and task at hand. Such parameters, as noted, are intended to minimize the increased risk of infection due to pathogens and microorganisms which tend to grow and propagate where the temperatures and humidity in the operating room are excessively high.

Conventional HVAC systems maintaining the room air within operating rooms follow guidelines of the CDC which has adopted the American Society of Heating, Refrigerating and Air-Conditioning Engineers (ASHRAE) standard for operating room ventilation. This, as noted, requires complete air changes of the positively pressured air within the operating room to be changed fifteen times per hour with a minimum of three outdoor air changes per hour. Additionally, the air temperature within the operating room should be maintained at between 68-73° F. with a relative humidity between 30-60 percent.

With the conventional means for maintaining these CDC parameters, this air change and introduction of outside air is handled by the HVAC staff, along with a thermostat maintaining the temperature and humidity to such standards. Outside air is, conventionally, filtered to remove particulate within the air supply communicated into the HVAC system from the surrounding area of the medical facility. However, the staff is generally making these adjustments without any computations in a hit or miss action where the outcome, more frequently than not, does not maintain the operating room to desired standards.

In the system herein, the real time assessment and adjustment of the HVAC airflow into the operating room or portable rooms or SCIFs is based on a predetermined computer generated optimal computational fluid dynamic (CFD) model for each operating room. This optimal CFD operating room model, or other room model, generated using CFD software operating to the task, is stored in electronic memory of the service provider in a manner where it is associated to the respective operating room, such as to the assignment of an operating room identifier unique to each operating room.

By optimal computer fluid dynamics (CFD) model herein is meant at least the CDC approved American Society of Heating, Refrigerating & Air-Conditioning Engineers (ASHRAE) standard for operating room ventilation. In addition, the optimal CFD model can also include the current ISO standard 14644-1 for a concentration of particles which OSHA cites as required for infection control in operating rooms and clean rooms. Still further the optimal CFD model can include the requirements under ICD/ICS 705 for modular rooms and SCIFs. Such standards as the ICD/ICS 705 are published by the National Counterintelligence and Security Center of the U.S. Government, such as the publication on Mar. 13, 2020.

Thereafter, air sensing components will continuously monitor and determine exhaust airflow characteristics and composition found in the exhausting airflow from that operating room. Users of the system herein, such as hospitals having multiple operating rooms and surgery centers and the like, will subscribe to the service to have one or more operating rooms at their facility monitored to allow the system herein to optimize the HVAC system providing the operating room air quality to continue the actual operating room operation substantially to the Optimal CFD Model for that operating room.

Such measured exhaust airflow characteristics which affect the air changes per hour (ACH), for example and in no way limiting, have been found by experimentation to include at least four variables found to have the greatest impact on the air changes per hour (ACH). These include:
  Particle Size: 0.1 to 2.5 microns;
  Position of Lights: head and feet (over the operating table);
  Operating Room Temperature: 68 to 70 F (and equivalent in C); and
  The Position of Outlets in the Operating room.

Other exhaust flow characteristics may be included, such as a particle count of particulate in the exhaust airflow. CFD analysis can also make a determination of the size and a velocity of such particles and a determination of a trajectory of such particles. These exhaust flow characteristics are ascertained by monitoring the exit air flow from the operating room at exhaust vents of the HVAC of the positively pressured operating room.

It is preferred in the system herein, as noted, that each respective operating room be associated with an operating room identifier and that each such operating room being monitored will initially be surveyed as to the operating room physical characteristics and that a CFD analysis is performed based thereon to determine an optimal CFD model therefor. Where the room being monitored is an office or enclosed space or SCIF the interior of the office or SCIF may be surveyed as to the room or SCIF physical characteristics and that the CFD analysis is performed based thereon to determine an optimal CFD model therefor. It should be noted herein that while operating rooms are the primary description of rooms for monitoring and maintaining by the system, office rooms and SCIFs may also be included within the scope of that term.

In this initial CFD analysis or optimal CFD model, the characteristics or variables employed in the computation can include the room size, the air volume contained in the respective operating room, the number of medical personnel, a patient on the operating table, the medical equipment and location thereof within the operating room, and the location of the incoming HVAC air supply vent as well as the location, size and number of the exhaust vents for the respective operating room. These respective operating room physical characteristics for each respective operating room will be associated therewith along with the operating room identifier of that respective operating room along with the geographic location of the operating room.

For office rooms and enclosed structures, such as SCIF's unless the room is a portable operating room, as described herein, the same characteristics and variables as to vent location and size and furniture location and equipment and its location may be included in the computation, as noted above.

This CFD software-generated optimal CFD model generated thereby, for each identified operating room, will be stored by the system provider in electronic memory. Thereafter, this optimal CFD model is employed for future comparison with future generated current CFD models based on the variables from currently measured and input airflow characteristics. These measured current airflow characteristics or variables, such as the four noted above, used to generate the current CFD model, are input to the provided graphic user interface for such by local users or personnel.

Subsequent to the association of each operating room with a respective operating room identifier and a respective optimal CFD model, the system herein, employing software operating to the various individual tasks and calculations to maintain these required or desired air quality standards, will significantly improve the operating room air environment. Such is accomplished by providing for real time monitoring of and adjustments to the variable airflow characteristics of the respective operating room to maintain air quality within the operating room to substantially equal or meet the respective optimal CFD model for that respective operating room stored in electronic memory, The software-enabled system, in the preferred mode, operates to allow local personnel to maintain the temperature and humidity in the communication of the incoming airflow from the HVAC system into the operating room to maintain it substantially to that of the optimal CFD model for that room. Such may be accomplished through the real time monitoring of the airflow characteristics of the air supplied to the operating room (normally termed supply air) and the exhausted air to yield the desired air changes per hour.

In addition to employment of sensors for real time monitoring of temperature and humidity and ongoing volumetric air changes within the operating room, the system further employs a sensor in the form of a particle counter to monitor for particulate in the airflow system. Such particle counter sensors, for example, are the "AeroTrak" by TSI Incorporated in Shoreview, Minnesota and the model 3950 amongst others, as manufactured by Kanomax USA, Inc. in Andover, New Jersey. Other particle counters, which are or become available which operate to monitor number of particles of a particular size in the exhausting airflow from the operating room being monitored, may be employed.

Using software operating to the task of receiving the current exhaust airflow characteristics which are input to the graphic user interface by a local user, the system will input those current airflow characteristics for employment by CFD software. The CFD software will employ the input variables of the current airflow characteristics or variables captured and communicated to the system provider to generate a computational fluid dynamics (CFD) analysis to thereby ascertain the current CFD model for the operating room being reviewed. This current CFD model will be generated by CFD software which operates substantially similar to that which generates the optimal CFD model held in memory or generates output data which is employable by other CFD software for calculations in the same fashion as, for example Excel spreadsheets, are employable with multiple programs.

To provide local personnel with measurements of the variables characteristics, a particle counter and other airflow measuring components continuously monitor the exhaust air flow from each operating room associated with a respective room identifier by the system. Such may be displayed upon a graphic display or otherwise communicated to an inquiring user.

Using the received exhaust flow characteristics or variable input from the local personnel to the graphic user interface which are transmitted over a network, a comparison computational fluid dynamics (CFD) analysis is performed. The comparison CFD analysis will compare discerned current CFD models to the optimal CFD model stored in electronic memory for the respective operating room being examined. Based upon the comparison CFD analysis, the system employing CFD software or other software operating to the task will calculate any HVAC incoming air supply characteristic changes which are required for the current CFD model to substantially match and meet the optimal CFD model. Such a computation may be performed on a local computer system or, more preferably, on a network-connected computer of the service provider in the cloud.

Computational fluid dynamics (CFD) is well known to those skilled in the art as a branch of fluid mechanics which employs a numerical analysis and data structures to analyze and calculate solutions to problems that involve fluid flows, such as airflow in an HVAC system and its effect on that of a confined space, such as an operating room. CFD analysis software, operating in electronic memory on computers, is employed herein to perform the calculations required to simulate the free-stream flow of the fluid and the interaction of the fluid (liquids and gases) with surfaces defined by boundary conditions. With the advent of higher speed computers, better solutions can be achieved and are often required to solve the largest and most complex problems. Ongoing research yields improved software having computational formulas which improve the accuracy and speed of complex simulation scenarios, such as transonic or turbulent fluid or air flows. In addition, previously performed analytical or empirical analysis of a particular problem, such as the airflow characteristics of a previously surveyed operating room or rooms of similar dimensions in a database thereof, can be used for a comparison.

Such CFD software is widely available from many firms and includes computational algorithms to process input information and to provide a calculated outcome based on multiple variables or characteristics. These calculated outcomes can be employed to compare the current CFD model of the operating room input by local personnel to the optimal CFD model for that operating room and. thereafter, calculate and provide any required change in air flow characteristics to bring the operating room airflow characteristics to substantially the optimal CFD model.

For example, Autodesk CFD by Autodesk of San Francisco, California and ANSYS, Inc. of San Jose, California are two well known providers of such CFD software which include or provide the ability to formulate mathematical formulas to generate an electronic model of fluid flow characteristics in a defined indoor space such as an operating room.

Using such software, a CFD analysis by such CFD software, the optimal CFD model can be generated from the input variables of airflow into and exiting the operating room. In the same fashion, using such software, a current CFD analysis and current CFD model generation can be ascertained using the input variables of supply exhaust air characteristics from the graphic user interface. Such characteristics can include the noted particle size between 0.1 to 2.5 microns, the position of lights in the operating room, the operating room temperature, and the number and position of air outlets exhausting air from the operating room is performed.

Thereafter, employing the variables of the user input, a current CFD model may be calculated. Using software operating to the task of comparing the current CFD model to the optimal CFD model and generating the HVAC airflow changes required for the incoming air supply characteristics to return the operating room substantially to the optimal CFD model, changes to be made to the flow of input air are communicated to the local user. These changes to fan speed, temperature, humidity, and other variables are calculated to provide and maintain the operating room air flows substantially to those of the optimal CFD model. While, as noted, these airflow changes can then be implemented locally by personnel with access to the HVAC system controls, alternatively, the system provider can communicate the required airflow changes directly to a computer controlling the HVAC system for the identified operating room.

In another optional step of the system herein, particles determined to be within the exhaust airflow from an identified operating room can be identified by the number of particulates of a particular size, in microns, by the particle counter. Where the particles are identified as particulate in the operating room air, such as those carried into the operating room on bedding or clothing, the identified particles may be compared with a particulate database held in electronic memory accessible to the software of the system. Such a particulate database will contain information for each geographical area of the particulate normally present in the air in that geographic area. If the comparison determines the particles identified are a normal content of the local outside air which has been communicated into the operating room by the HVAC system during the required complete operating room air change with exterior air, then such may be communicated to the personnel maintaining the HVAC system for the identified operating room as a means to determine if filter changes are necessary.

However, if the identified particulate is foreign to that known to be present in the geographic area of the identified operating room or if the size of the particulate is such that it would show filtration problems, filter changes for the incoming air from outside the facility housing the operating room can be implemented.

In another preferred mode of the system herein, the particle counter monitoring and determining the size and velocity and trajectory of the particulate in the exhaust airflow characteristics of an identified operating room can compare such to a pathogen database which the system herein may maintain. Such a database may relate to individual known pathogens to the particle size, velocity, and trajectory of known pathogens which have been identified by the CFD analysis for the optimal CFD model. In this fashion, should a match to one or more pathogens be identified in the exhaust airflow of an identified operating room, the HVAC system can be directed to change the indoor temperature set point and/or supply airflow to reduce or eliminate the identified pathogen.

As such, the system herein, using the database relating to the particulate in the geographic area of the identified operating room being monitored and the pathogen database which includes determined characteristics of such as to size, trajectory, and velocity, and the CFD software computational fluid dynamics analysis of the exhaust flow characteristics communicated from a particle counter in an identified operating room, immediate and ongoing adjustments can be made to the airflow of the HVAC system of the identified operating room to meet and maintain CDC and local requirements therefor.

In all modes of the system, except those where isolation is required such as a SCIF wherein the steps are performed without a network, for the steps herein noted, the system provider may employ network accessible servers or computers having accessible electronic memory for storage and retrieval of electronic database information relating to each operating room associated with an identifier thereof, and airflow characteristic and other norms and related data needed correlating to the stated task or step or requirement of the operation noted to be performed by the software. Software, running in electronic memory, will operate to perform each step or task or calculation herein based on the communicated exhaust airflow characteristics determined by the particle counter and other sensors, such as a thermometer and humidity detector. Thereafter, the calculated changes to the operation of the HVAC system of the identified operating room will be transmitted to the identified operating room HVAC system. Subsequent particle counter and sensor readings of the exhaust airflow characteristics of the same identified operating room may be employed to ascertain if the desired result in the identified operating room air optimization has been reached or if additional adjustments are calculated as necessary.

As to electronic memory or computer readable media for the system herein, any combination of one or more computer-usable or computer-readable media, be it transitory or non-transitory, may be employed for operation of the software and assessment system herein. Such, for example and in no way limiting, can include computer-readable media and may include one or more of a portable computer diskette, a hard disk, a random access memory device, a read-only memory device, an erasable programmable read-only memory (EPROM or Flash memory) device, a portable compact disc read-only memory device, an optical storage device, and other electronic memory magnetic storage devices. Software or computer program code for carrying out the individual and sequential operations and airflow assessments of the present invention may be written in any combination of one or more programming languages.

The steps or method of operation and/or execution of the various modes and tasks of the system herein may be illustrated as blocks or steps in the drawings which may represent one or more sequences in the operation of the steps and assessments in the system herein. These operations or steps can be implemented in hardware, software operating to process input data to accomplish the task or step, or a combination thereof.

With regard to software operating to a task or steps or assessments indicated in the system herein, such represents computer-executable instructions stored upon one or more transitory or non-transitory computer-readable storage media, which, when executed by one or a plurality of processors, will operate to perform the recited task, assessment, operation or step. Computer-executable instructions, in general, include routines, programs, algorithms, data structures, and the like which are configured to perform particular functions or to implement particular abstract data types or steps noted.

It should be noted that the sequence in which the steps of the system herein are described or depicted for room airflow assessment and subsequent optimization thereof are not intended to be construed as a limitation. It should be understood that any number of the described or designated steps can be combined in any order and/or in parallel to implement the described and depicted assessments and processes. In some modes of the system herein, one or more steps can be rearranged or omitted entirely. Still further, the software-enabled steps in the system herein can be combined in whole or in part with each other or with other steps or methods.

With respect to the above description, before explaining at least one preferred embodiment of the system and method of assessing room airflow variables or characteristics and optimizing such airflow for the minimization of the impact of particulate and pathogens, it is to be understood that the invention is not limited in its application to the details of operation nor the arrangement of the components or the steps set forth in the following description or illustrations in the drawings. The various methods of implementation and operation of the system and method herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other methods and systems for room airflow assessment and for carrying out the several purposes of the present method. Therefore, that the objects and claims herein should be regarded as including such equivalent construction, steps, and methodology insofar as they do not depart from the spirit and scope of the present invention.

It is an object of this invention to provide a computer-implemented method employing software operating to the task of assessing existing airflow patterns in rooms of medical facilities and to determine, from an optimal CFD model and a real time current CFD model, one or more adjustments of the characteristics of incoming and outgoing airflow to substantially match current air flows to that of an optimal CFD model stored in electronic memory in relation to each operating room.

It is a further object of this invention to provide such an airflow assessment and adjustment system and method which also will assess the impact of each calculated incoming airflow characteristic change on occupants of the room being reviewed, such as doctors, health care, and other professionals who are frequent occupants thereof.

It is yet another object of this invention to provide such an airflow assessment system which may be operated using alphanumeric inputs from local personnel to a graphic user interface provided by the system provider.

These, together with other objects and advantages, which will become subsequently apparent, reside in the details of the construction and operation of the room airflow assessment and redesign system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some but not the only or exclusive examples of embodiments and/or steps of the operating room air optimization system herein. It is intended that the embodiments and figures disclosed herein are to be considered illustrative of preferred modes of the system rather than limiting.

In the drawings.

DETAILED DESCRIPTION OF THE PREFERRED EMBODIMENTS OF THE INVENTION

Referring now to the method and system 10 herein shown in simple format by the depictions of FIGS. 1-10, as noted above, software operating to the task of performing each step or task in the system 10 for optimizing the air in a room such as an operating room 12 or portable room or SCIF, will operate on either on a local computing system or a network-connected computers having such software operatively running thereon.

Figure 1:
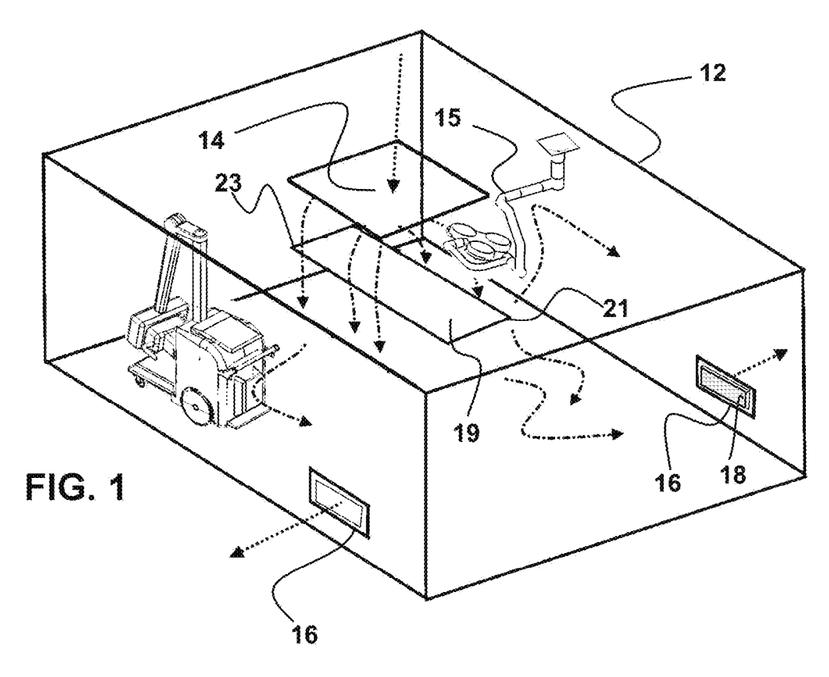
FIG. 1 is a simplified depiction of a conventional operating room having length, width, and height characteristics and lighting and equipment positions where the airflow is monitored and adjusted by the system herein using CFD analysis.

In FIG. 1 is shown a simplified depiction of a conventional operating room 12 for which the system 10 operates to optimize air within the operating room 12. It should be noted that for convenience the term operating room is used herein and in the drawing steps, and such should be considered to include a portable room or a SCIF.

Initially, each operating room 12 will preferably be subjected to a survey to determine the physical characteristics thereof and the variables or characteristics in airflow, such as speed or flow rate generated by the HVAC fans, to calculate an optimal CFD model for each respective operating room. A different optimal CFD model is initially calculated and stored in electronic memory in a relation to each respective operating room.

Such physical characteristics or variables employed for both the optimal CFD calculation and subsequent CFD calculation, may include the length, width, and height of the operating room 12 to ascertain the air volume therein. Also included, preferably, are air flow variables, such as the location of the airflow inlets 14 from the HVAC system. Additionally included in both the originally calculated optimal CFD computer model for each respective operating room are the air flow characteristics or variables the user or local personnel will be allowed to adjust by remote input into a graphic user interface.

Figure 2:
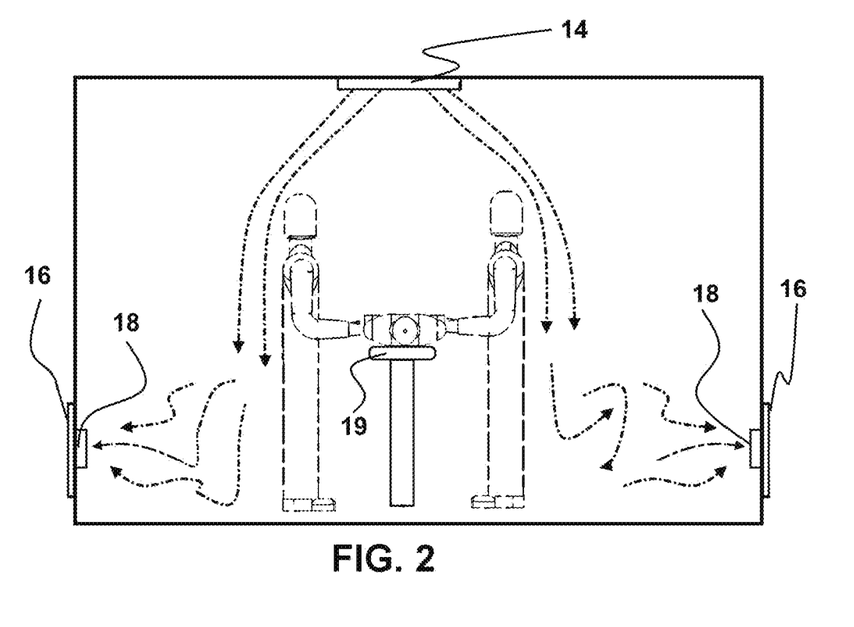
FIG. 2 shows a depiction of medical personnel underneath an incoming airflow which is directed to position the personnel and the patient and showing a plurality of airflow outlets with sensors operatively positioned.

Currently, the user adjustable variables which, in experimentation, have been found to most affect the current operating room airflow and the adherence to the desired optimal CFD model include the sensor determined particle size in a range between 0.1 to 2.5 microns, the position of the light fixture 15 over the operating room table 19 relative to the head 21 and foot 23 of the operating room table 19, the current determined room temperature from temperature sensors, and the location of the air flow outlets 16 in the respective operating room. Where the system is employed to optimize and control airflow within portable office or SCIF determinations of furniture and computer and lighting and other items within the room may also be included in the variables considered.

Such user adjustable variables or characteristics, once communicated to the service provider or local computer system through the provided graphic user interface, are input to CFD software operating to the task of computing required local changes in the volume, and/or speed, and/or temperature of incoming air to cause the operating room to again substantially equal the optimal CFD model for that respective operating room.

One or a plurality of exhaust flow characteristic sensors 18, such as particle sensors and/or humidity sensors and/or temperature sensors and/or airflow speed sensors, and other sensors as required, are located to receive and measure the exhaust airflow characteristics through each airflow outlet 16. As noted, these sensors 18 are preferably electronic and configured with local computer or network communication ability to communicate the discerned exhaust air flow characteristics or variables to a computer and video display viewable by local personnel or users and/or to the computer or server of the system provider where network communications are available and allowed. The user in turn can then input the discerned user adjustable variables or airflow characteristics into provided input positions on a graphic user interface communicated to them by the system provider.

Once the user or local personnel have input the adjustable variables into the graphic user interface, such are communicated to the local or remote computer or server running software operating to the tasks herein from the system provider. Thereafter, CFD or other software configured to the task of determining airflow and any temperature adjustments needed at the local operating room or portable room to change the current operating room 12 airflow characteristics substantially to that of the originally determined optimal CFD model for that operating room.

Such changes, for example, primarily would be causing the HVAC system to change the volume and speed of the incoming air communicated to the airflow inlets 14, as well as the temperature and humidity of the incoming air from the HVAC system. In one mode of the system herein, such sensors 18 can be portable and thereby moveable between operating rooms or clean rooms, or they can be mounted in a fashion adapted to monitor the air in the manner herein.

Figure 3:
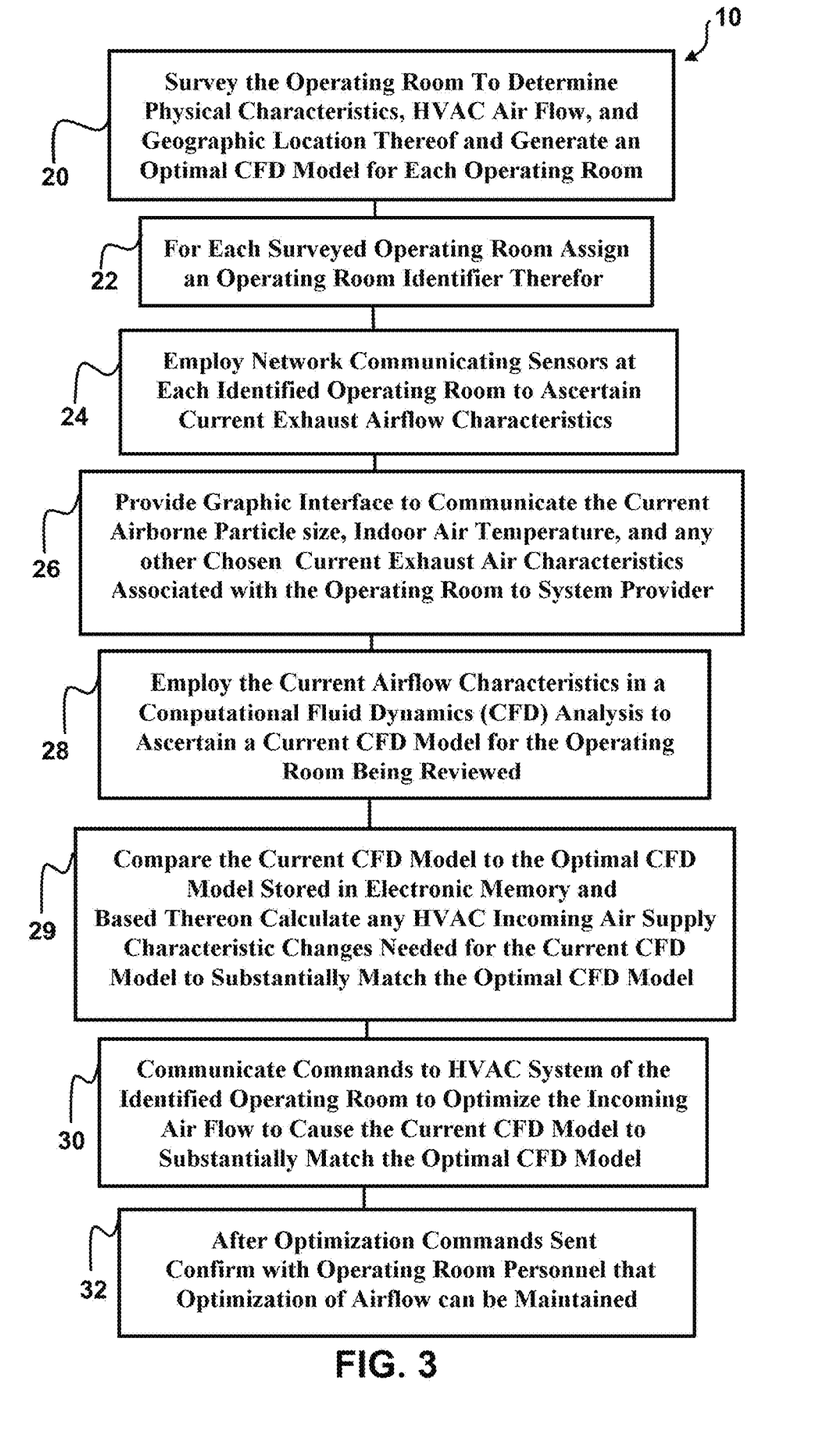
FIG. 3 shows a box chart of steps in the system herein for ascertaining current air conditions of the operating room and adjusting the HVAC to optimize them for the airflow of a predetermined optimal CFD model for that operating room.
Figure 4:
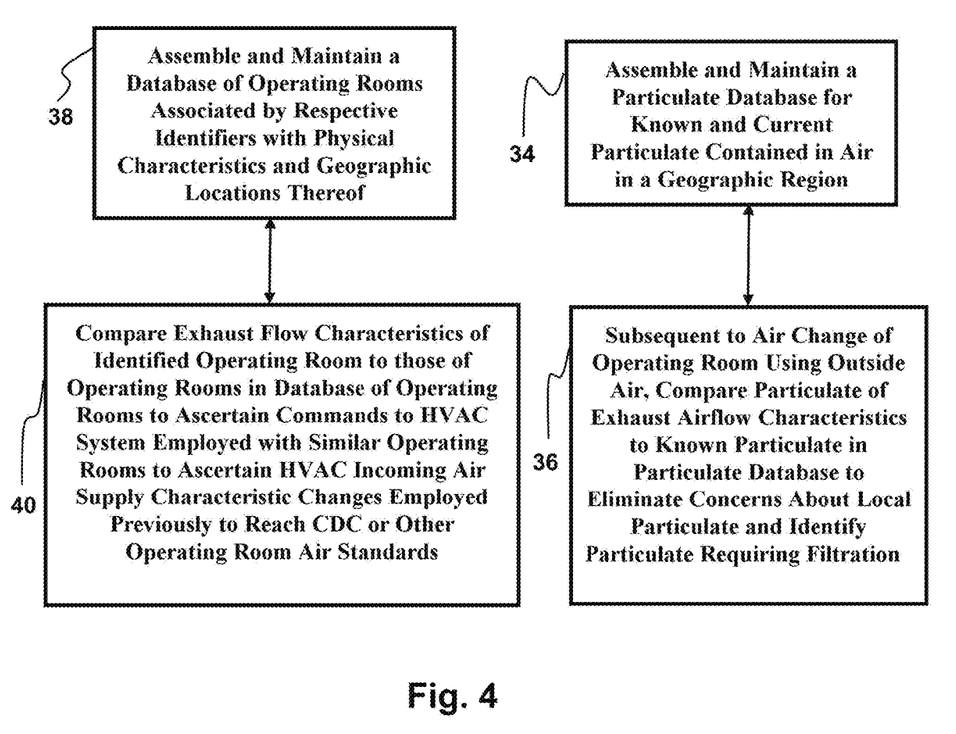
FIG. 4 depicts other preferred steps in the system for optimizing operating room air.

As depicted in simplified format in FIG. 3, in the system 10, an initial survey 20 is performed upon each operating room or portable room or SCIF to be monitored as to the physical characteristics and above noted airflow variables and/or geographic location. Additionally, for each surveyed room a room or operating room identifier is assigned 22. Such an assigned identifier 22 is preferably associated with each respective room or operating room 12 to be monitored and continuously optimized by the system 10.

For each room or operating room 12 to be optimized by the system 10, sensors, as noted, are positioned to ascertain the airflow variables or the exhaust airflow characteristics 24. The sensors 18, so positioned, as noted, preferably, are in communication with the computer or computer server having the software operating to the tasks herein from the system provider, to thereby communicate the real time information thereto concerning the current exhaust flow characteristics 24 of the identified operating room to a local computer or over a network, such as the Internet or another electronic network. These real time exhaust flow characteristics 24 may concurrently be communicated to a display viewable by the local users.

Figure 5:
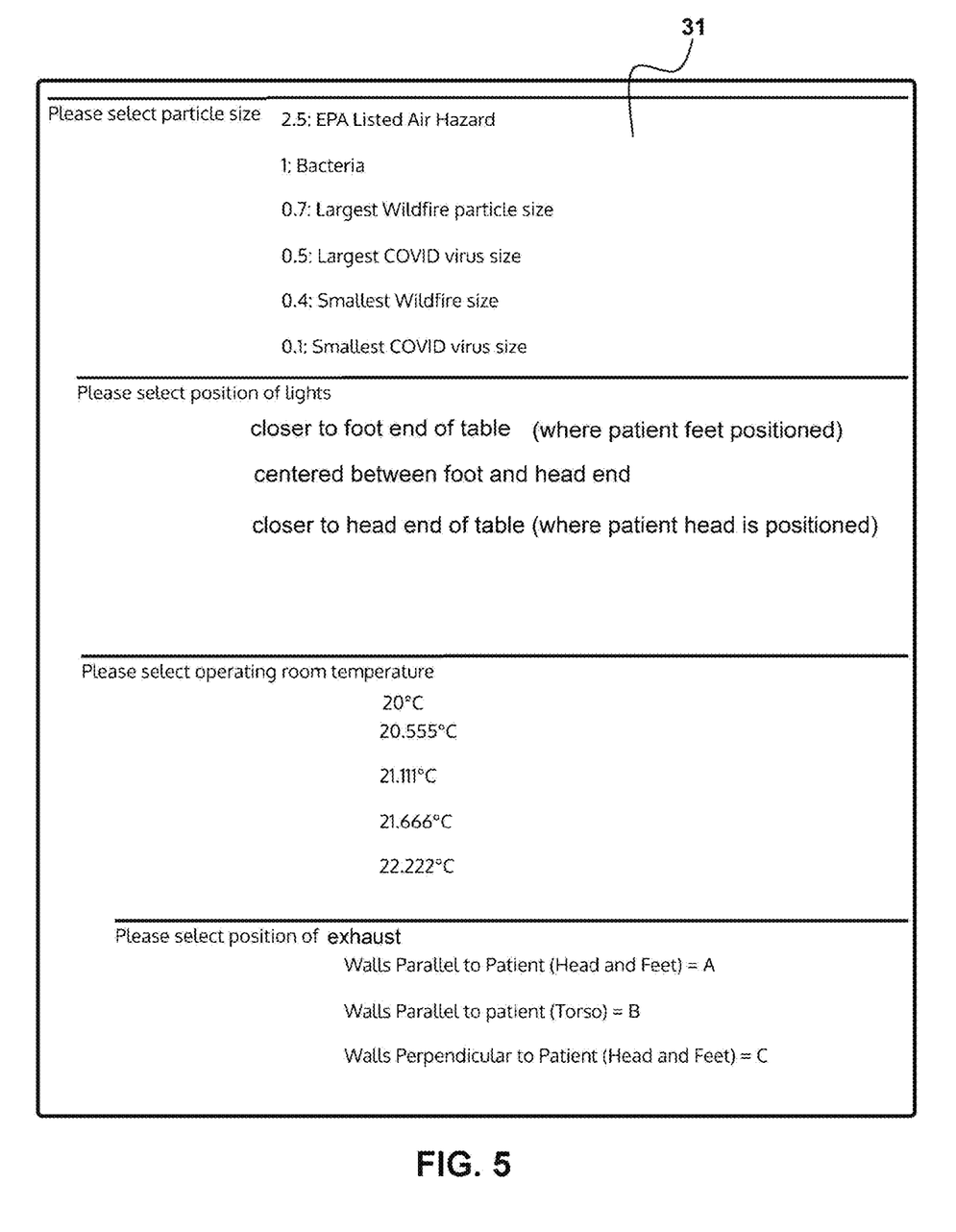
FIG. 5 depicts an example of the provided graphic user interface communicated from the service provider to the local personnel for the input of currently measured variables or airflow characteristics which are employed in a comparison of the current CFD model to the optimal CFD model to thereby calculate required airflow changes to render current operating room airflow substantially equal to that of the optimal CFD model.

In another preferred step, the local personnel or user may be provided with a graphic user interface, such as in FIG. 5, to enable them to communicate the current adjustable user variables which are displayed from the sensors 18. While all of the above noted airflow characteristics or variables could be displayed for user input, it has been found in extensive experimentation that user input of one to four of such displayed characteristics or variables provides sufficient information for the system to calculate changes in airflow to optimize the operating room in question. This is because users need not become confused or overworked by inputting the entire group, noted above, of such air flow characteristics or variables.

Thus, currently, the system in a step may provide the user with a graphic user interface 26 which enables the user to input sensed values for current airborne particle size, the current indoor air temperature, the position of the light fixture 15 over the operating room table 19 relative to the head 21 and foot 23 of the operating room table 19, the location of the air flow outlets 16 in the respective room, SCIF or operating room walls.

As noted, the provided data to the user is provided by the appropriate one or plurality of sensors 18 which are placed in or adjacent the airflow outlet 16. The sensors 18 will generate an electronic signal output of a current particle count and size from a particle counter sensor. The current temperature can be determined from a thermostat in the room, SCIF or operating room and the position of the light 15 and airflow outlets 16 are viewable by the user.

Using the input by the user from the graphic user interface 31, the system will employ the input variables and current airflow characteristics in a computational fluid dynamics (CFD) analysis to ascertain a current CFD model for the room, SCIF or operating room being reviewed 28.

To calculate needed airflow changes to the room or operating room being examined, the system employs software operating to the task of comparing this current CFD model to the optimal CFD model stored in electronic memory 29 and based thereon, will calculate any HVAC incoming air supply characteristic changes needed, such as volume, temperature, filtering, and speed, for the room or operating room based on the current CFD model to substantially match the optimal CFD model.

For example only, this CFD analysis, using the communicated particle count signal representing such input by the user in the user current adjustable variables of temperature, current airborne particle size, the current indoor air temperature, the position of the light fixture 15 over the operating room table 19 relative to the head 21 and foot 23 of the operating room table 19 and the location of the air flow outlets. For an enclosed room or SCIF the inputs can be adjusted to furniture positions, desk positions, worker positions, and other variable which occur in an enclosed office or SCIF. Using software operating to the task, the system will calculate any changes needed to the incoming HVAC air supply which are required to optimize the air within an identified room or operating room 12 to substantially equal that of the optimal CFD model and in doing so will thereby be in compliance with CDC and/or other agency or required air standards.

Subsequent to the CFD analysis 28 and the comparison 29, the system will communicate commands 30 through direct connections to or over the network to the HVAC system of the identified room or operating room 12, which have been determined by the CFD analysis 28 and the comparison 29 to be required for the air entering the identified room or operation room to reach that of the optimal CFD model and thereby meet any of the regulating agency standards, such as ISO standard 14644-1 or ICD/ICS 705.

Figure 6:
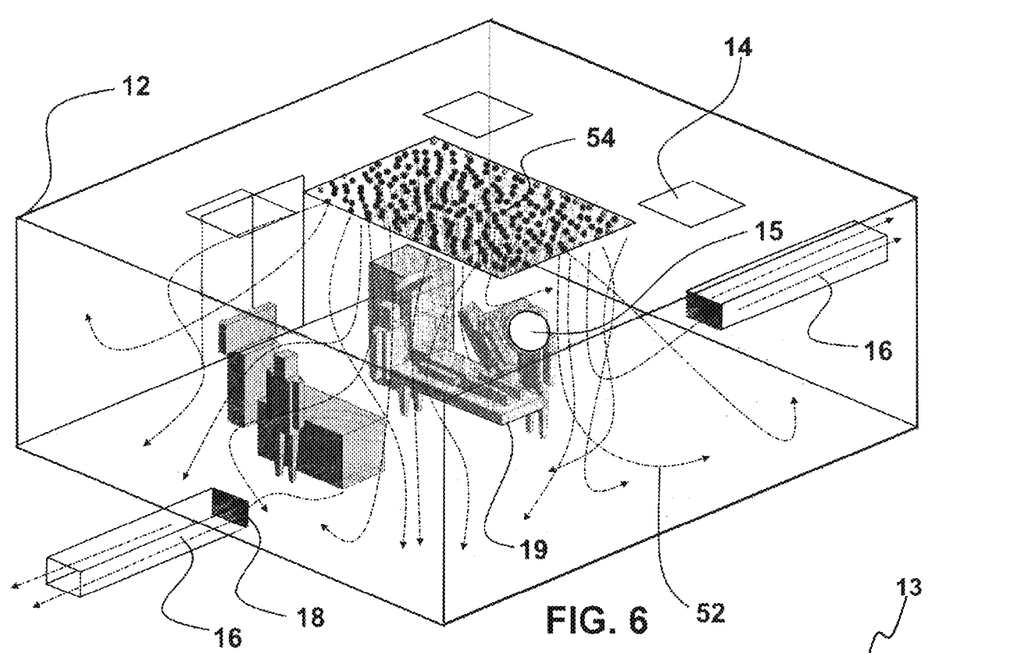
FIG. 6 depicts a conventional computer generated model of operating room air flow using CFD software and the variables noted herein.

In such a CFD simulation, either for the optimal CFD model or the determined current CFD model, such as shown, for example only, in FIG. 6 and in no way limiting, a graphic representation of the room or operating room airflow 52 of the particles 54 at the size selected, based upon the current airflow in the room or operating room from the HVAC supply air 14 and exiting exhaust air 16 is generated.

Figure 7:
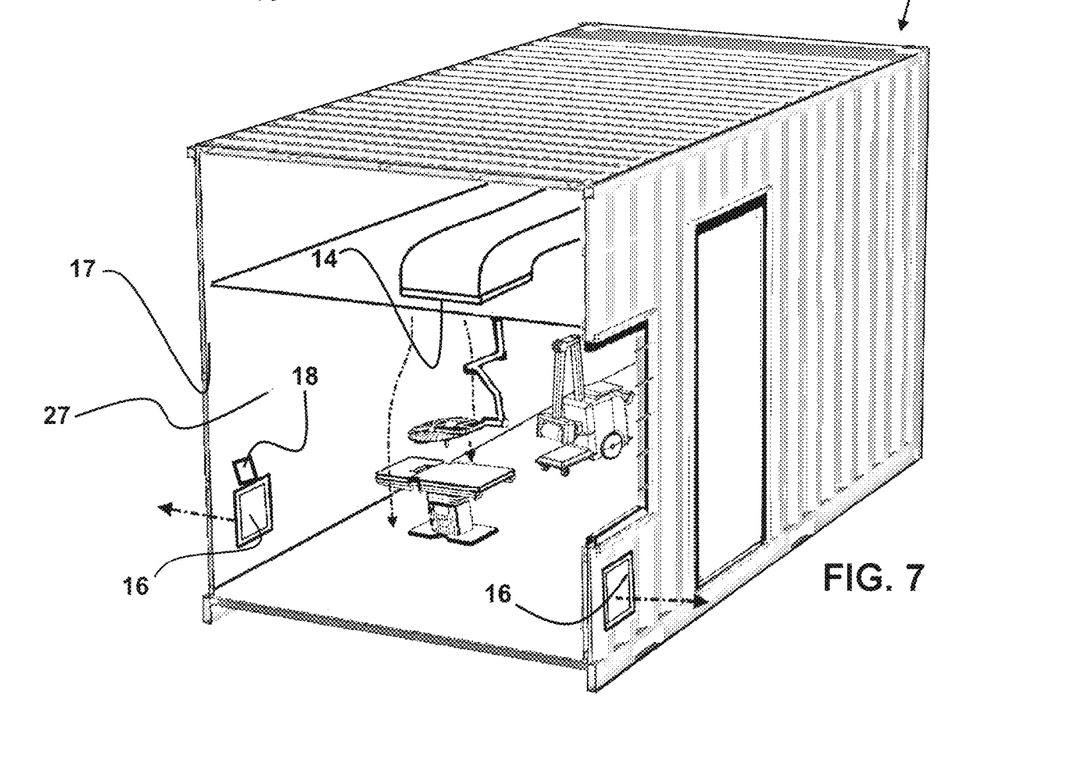
FIG. 7 shows an operating room or medical facility similar to that of FIG. 6, but wherein it is portable.
Figure 8:
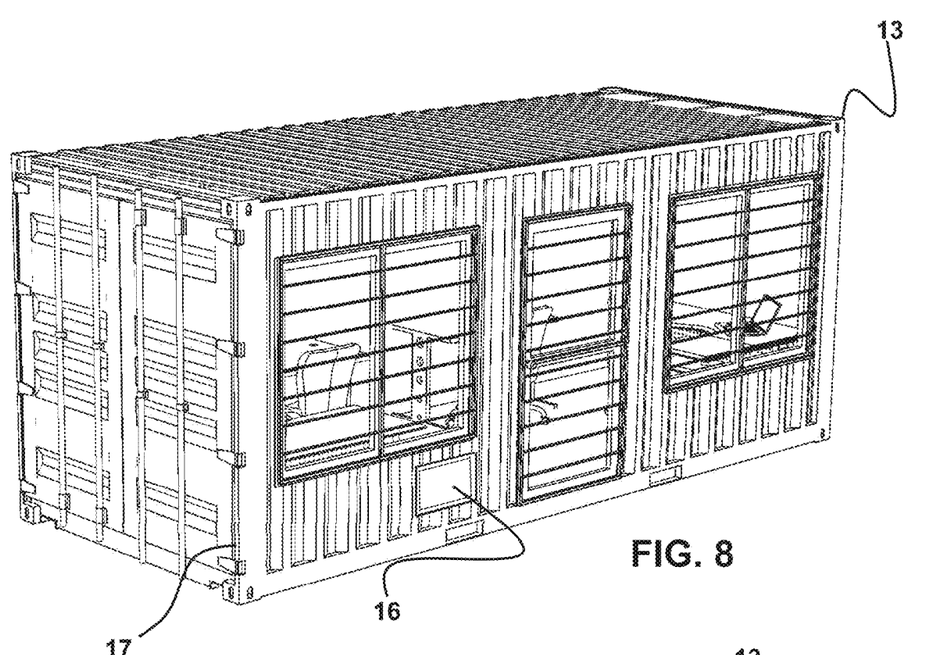
FIG. 8 shows a portable office space which, as viewed, is containerized to allow for easy local and international transport to remote uses sites.
Figure 9:
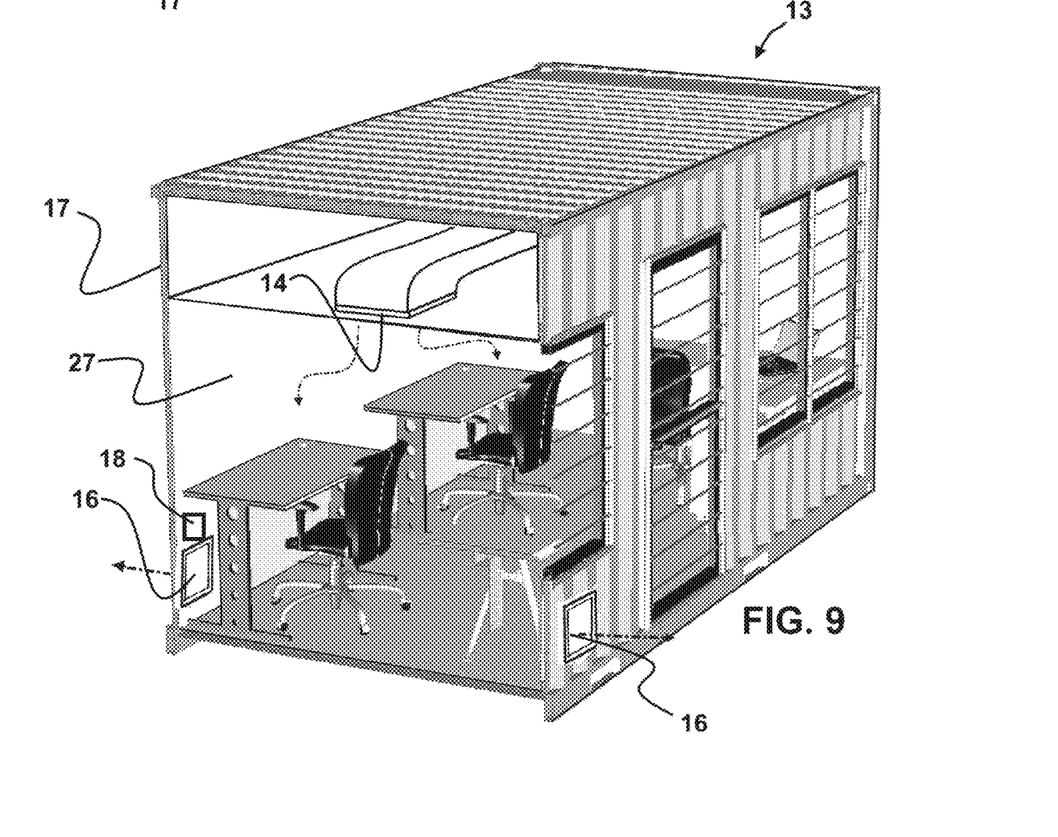
FIG. 9 shows a cut away view of a containerized portable office, such as in FIG. 6, showing a configuration of such with desks and chairs and airflow therethrough.
Figure 10:
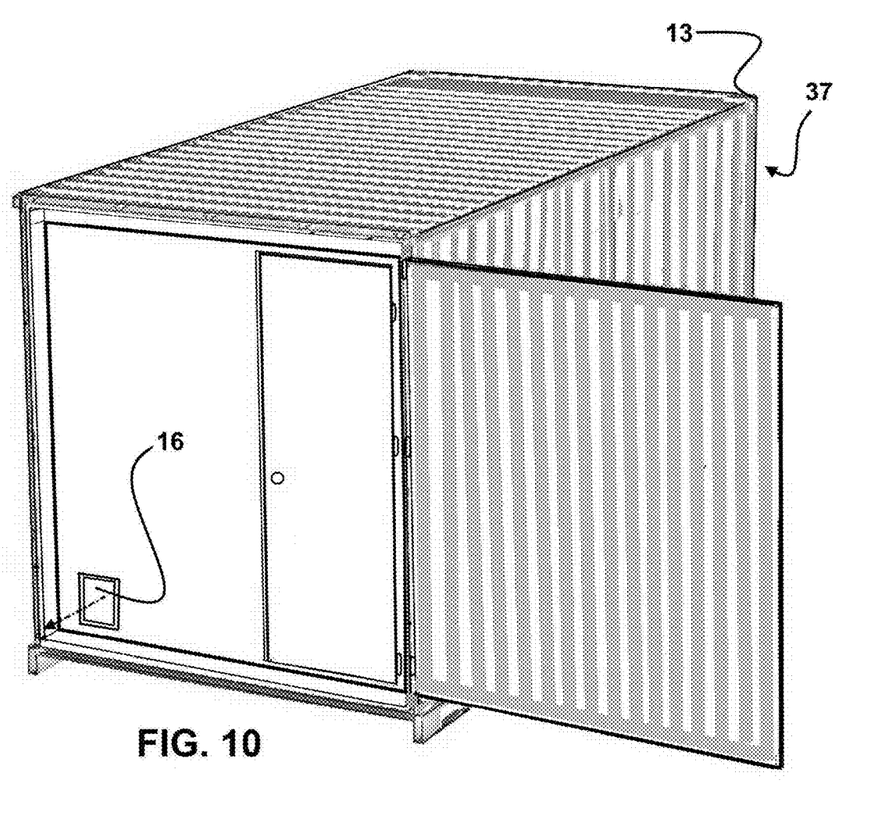
FIG. 10 depicts a SCIF widely used by companies and the military to provide a secure area, room, or group of rooms where sensitive information is processed, stored, or discussed.

The same graphic representation of room airflow 52 may be employed with the portable operating room of FIG. 7 and the portable offices and the SCIF shown in FIGS. 8-10 all of which must maintain respective specific air standards within the enclosure as well as positive pressure therein.

The data results generated from this electronic CFD graphic representation may also then be uploaded into a local computer, if the room is isolated, or an AWS or an equivalent cloud-based machine for the CFD comparison and adjustment determination. A learning app to "learn and optimize" a determined airflow from the HVAC to achieve the particle counts to be within 5% of the ISO standard, or other required standards may also be employed. Output from this comparison of the current CFD model and the optimal CFD model to reach an optimized CFD simulation will result in the communication of the commands 30 in a manual or electronic signal to the local HVAC supply and exhaust fans to modify their airflow characteristics.

With the HVAC of the identified room or operating room having implemented the communicated commands from the system, the system will continue to employ the sensors 18 to continue to ascertain the exhaust air flow characteristics of the room being monitored to determine if the desired air optimization has been reached and/or continues.

Another example of an enclosed room in which positive air pressure is required, is depicted, for example, in FIG. 7 which shows a similar facility to that of FIGS. 1-2 and 6, in the form of a portable enclosure 13, all of which require positive air pressure to be maintained along with the other standards noted herein. The airflow components, shown in FIG. 6, will be included in a similar configuration adapted to perform the air supply and monitoring and changes to exiting airflow in the portable room enclosures 13 of FIGS. 7-10. However, the HVAC system itself may be included on or within the shell or housing 17 surrounding the enclosed portable room This allows each such portable room and fully enclosed portable room enclosures 13 to supply the incoming air supply continuously into the room 27 and to initially generate an optimal airflow model for each respective room or portable room 27 using software operating to compute an optimal fluid dynamics model therefor, from a memorized initial airflow characteristics of the portable room 27. This optimal fluid dynamics model can then be stored in a computer readable medium within an onboard computer having processors and engaged memory where the room is to be isolated or on a networked computer where not.

Thereafter, employing onboard sensors 18 in communication with the exiting airflow exhausted through the airflow outlets 16 from the portable room 27, current airflow characteristics of the room can be discerned and communicated to the onboard computer housed in the room or in some case by network connection, if the room 27 is not required a total disconnect, such as that required of a SCIF. The high isolation requirements of a SCIF for both air supply and communications will require all computing components and memory and HVAC components to be housed onboard and within the confines of the sealed walls of the housing 17.

Software on the onboard computer system operating in memory to the task of employing the measured current airflow characteristics in a secondary computational fluid dynamics analysis can then ascertain a current fluid dynamics model for the portable room 27. If needed, software operating to the task of using the current fluid dynamics model can calculate changes needed, if any, to the incoming air supply from HVAC supply air 14 which are required to change the current the fluid dynamics model to substantially match the optimal fluid dynamics model. Essentially, the air monitoring and adjustments, noted above, for operating and other rooms are employed for portable rooms and SCIF's with the required standards for the type of room monitored.

FIGS. 8 and 9 show an example of a portable room enclosure 13 which is configured in an interior area or portable room 27 surrounded by a portable office space. This portable office configuration, conventionally, is either on a wheeled base or has a base allowing for positioning on a truck or plane or ship for relocation, such as that of a shipping container. A typical interior or portable room 27 is shown in FIG. 9, which shows an interior area or room 27 surrounded by the walls of a housing 17 of a containerized portable office which will have similar incoming air or HVAC supply air 14 such as in FIG. 6. As shown, such a portable room 27 may have desks and chairs and computers and HVAC systems and other components based on the isolation requirements of the room 27 of the portable room enclosure 13. The portable room 27 may also have positive pressure and other requirements or standards to meet in the analysis and adjustments implemented by the software operating to those tasks.

The system 10 herein is especially well configured for maintaining the airflow quality and other characteristics required of a Sensitive Compartmented Information Facility or a SCIF 37, such as is shown in FIG. 10 as an example. SCIFs 37 are secure areas or rooms or groups of rooms where sensitive information is processed, stored, or discussed. This may be information of a company or corporation or especially governments and military. Such SCIFs 37 are built to stringent standards outlined, such as in TEMPEST and in Intelligence Community Directive 705 (ICD/ICS705) where doors, hinges, and locks must meet vault-like requirements, and perimeter doors must use two access control technologies.

Further, ICD/ICS 705 HVAC and Airflow Management require that the airflow must include positive pressure within the room 27 and the system must be designed to prevent compromising emanations from passing an accredited or technical boundary. Separate protections are required to address acoustic protections. One of the key concerns is impacting air flow in the system when these security features are incorporated.

These SCIF requirements, such as ICD/ICS 705, may be included in the airflow monitoring and adjustment of the system herein. To that end, software operating to the task includes these SCIF requirements in the computed optimal fluid dynamics model generated from memorized initial airflow characteristics of the portable room 27 or SCIF. Thereafter, sensors 18 in communication with the exiting airflow 16 from the SCIF 37 may be employed to ascertain current airflow characteristics of the SCIF 37.

As with the room and operating room analysis, noted above and in the drawings herein, the current airflow characteristics are employed in a secondary computational fluid dynamics analysis to ascertain the current fluid dynamics model for the SCIF 37. Software operating to the task of using this current fluid dynamics model to calculating changes to the incoming air supply 14 required to change the current the fluid dynamics model to substantially match the optimal fluid dynamics model which includes the required SCIF requirements such as TEMPEST and/or ICD/ICS705 will be employed and the changes to the incoming airflow can be initiated electronically or manually if required.

By ICD/ICS 705 and SCIF air requirements herein is meant one or a combination of requirements from a group of requirements including: maintaining temperature such as between 68° F. to 72° F.; maintaining humidity between 30% and 60%; maintaining a positive pressure within the room of the SCIF; maintaining airflow changes typically between 6 to 12 air changes per hour; HEPA (High Efficiency Particulate Air) filtration, as needed, to maintain particulate size and number; monitoring the HVAC system inflow and outflow to reduce sound transmission (both airborne and structure-borne noise) to prevent eavesdropping; continuous monitoring of environmental conditions within the SCIF and the initiation of alarms, when deviations from a set point are discerned; initiating alerts for HVAC malfunctions or power loss, or deviations in airflow and positive pressure; when necessary actuating the onboard HVAC system to work in tandem with fire suppression systems (such as clean-agent systems) without compromising security; implementing smoke control measures to ensure safe evacuation and the protection of sensitive information in case of fire; and maintaining compliance with ASHRAE standards for HVAC design including ASHRAE 90.1 (Energy Efficiency) and ASHRAE 62.1 (Ventilation).

As noted above, the air optimization for rooms, such as operating rooms and other enclosed rooms such as those in FIGS. 7-10, requires not only positive air pressure be maintained but also multiple complete air changes per hour. This air change requires the HVAC system to communicate air from outside the room or operating room and facility, where it is geographically located, into the operating room for a complete exchange of operating room air. To that end, the system 10 herein, as an optional step, may assemble and maintain a database of geographic locations and their respective known particulate content 34 as to type and size and other relative characteristics. For closed a loop system, such as that for a SCIF 37, the required changes per hour may employ filtered air from with the room 27 of the SCIF 37 instead of exterior air.

During the comparison calculations 29 for air optimization for the operating rooms and portable room enclosures 13 and SCIFS 37 herein, the particulate size, communicated as being contained in the exhaust air flow characteristics by the sensors 18, can be compared to requirements or to the known particulate contained in the outdoor air of the geographic location of the respective operating room 36. Where outside air is employed for changes such will serve to eliminate concerns about some sensed particulate which is naturally present and to alert the system to particulate which is not naturally in the local geographic area. Thereafter, the system can either employ the comparison CFD analysis as to the HVAC operation changes to best minimize the known local particulate and to also identify particulate not known to be present in the geographic area where the operating room is situated.

In another optional step, adapted to portable room enclosures 13 and operating rooms, the system may assemble a relational database of individual respective similarly simulated rooms or operating rooms 38 or offices or the like. Such will include the known physical characteristics of each separately identified room or operating room in this operating room database in association with their respective geographic location. Using this database of respective identified rooms or operating rooms 38, the system can compare the sensor determined variables or exhaust flow characteristics of an operating room monitored on an ongoing basis by the system 40 to those identified in the database of operating rooms 38 to ascertain a respective operating room in the database which is similar in physical characteristics, to ascertain what HVAC incoming air supply characteristics changes were implemented to such to reach the required air standards. Such previously changed air supply characteristics, used for operating rooms in the database thereof to reach the required air standards, may then either be implemented in a currently monitored operating room and/or be included in the CFD calculations for the currently monitored operating room.

While all of the fundamental characteristics and features of the operating room airflow assessment and redesign system have been shown and described herein, with reference to particular embodiments thereof, a latitude of modification, various changes and substitutions are intended in the foregoing disclosure and it will be apparent that in some instances, some features or steps of the disclosed system may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention herein disclosed.

What is claimed is:

1. A system for maintaining an optimal airflow within a room having an incoming air supply from an heating, ventilation, and air conditioning (HVAC) system communicated through an airflow inlet, and having an exiting air flow from an airflow outlet, comprising:
    a processor, and
    a non-transitory, computer readable medium communicably coupled to the processor and storing instructions that, when executed by the processor, cause the processor to perform operations comprising:
    for the room supplied with the incoming air supply, generating an optimal airflow model for each respective room using software operating to compute an optimal fluid dynamics model from initial airflow characteristics of the room and store said optimal fluid dynamics model in said computer readable medium;
    employing sensors in communication with the exiting airflow from the room to ascertain current airflow characteristics of said room;
    employing the current airflow characteristics in a secondary computational fluid dynamics analysis to ascertain a current fluid dynamics model for the room;
    calculating changes to said incoming air supply which are required to change the current fluid dynamics model to match the optimal fluid dynamics model; and
    communicating optimization commands necessary to the HVAC system to cause it to provide said changes to said incoming air supply to said room, whereby said airflow through said room matches that of said optimal fluid dynamics model.

2. The system for maintaining an optimal airflow within the room of claim 1, additionally comprising:
    communicating said current airflow characteristics to a user; and
    providing a user graphic interface allowing said user to communicate the current airflow characteristics to a computer of a system provider.

3. The system for maintaining an optimal airflow within the room of claim 1, additionally comprising:

employing one or a combination of airflow characteristic variables for said initial airflow characteristics from a group of airflow characteristic variables measured by said sensors, including:
a room length of said room, a room width of said room, a height of a roof of the room, a location of the airflow inlet, a size of individual airborne particles within said exiting airflow, a position of a light fixture within the room, a current temperature within the room, and a location of an air flow outlet from the room.

4. The system for maintaining an optimal airflow within the room of claim 2, additionally comprising:
employing one or a combination of initial airflow characteristic variables for said initial airflow characteristics, from a group of airflow characteristic variables measured by said sensors, including:
a room length of said room, a room width of said room, a height of a roof of the room, a location of the airflow inlet, a size of individual airborne particles within said exiting airflow, a position of a light fixture within the room, a current temperature within the room, and a location of an air flow outlet from the room.

5. The system for maintaining an optimal airflow within the room of claim 1, wherein said room is an operating room.

6. The system for maintaining an optimal airflow within the room of claim 2, wherein said room is an operating room.

7. The system for maintaining an optimal airflow within the room of claim 3, wherein said room is an operating room.

8. The system for maintaining an optimal airflow within the room of claim 1, wherein said room is a Sensitive Compartmented Information Facility (SCIF).

9. The system for maintaining an optimal airflow within the room of claim 2, wherein said room is a Sensitive Compartmented Information Facility (SCIF).

10. The system for maintaining an optimal airflow within the room of claim 3, wherein said room is a Sensitive Compartmented Information Facility (SCIF).

11. The system for maintaining an optimal airflow within the room of claim 4, wherein said room is a Sensitive Compartmented Information Facility (SCIF).

12. The system for maintaining an optimal airflow within the room of claim 10 wherein said initial airflow characteristic variables include Intelligence Community Directive/Intelligence Community Standard (ICD/ICS) 705 air requirements.

13. The system for maintaining an optimal airflow within the room of claim 11 wherein said initial airflow characteristic variables include Intelligence Community Directive/Intelligence Community Standard (ICD/ICS) 705 air requirements.

14. The system for maintaining an optimal airflow within the room of claim 2, additionally comprising:
configuring said user graphic interface to limit said current airflow characteristics said user can input to:
a current airborne particle size;
a current indoor air temperature;
a position of a light fixture above a room table relative to the head and foot of the room table; and
a location of the air flow outlets.

15. The system for maintaining an optimal airflow within the room of claim 6, additionally comprising:
configuring said user graphic interface to limit said current airflow characteristics said user can input to:
an airborne particle size;
a current temperature within the operating room;
a position of the light fixture within the operating room; and
a location of the air flow outlet from the operating room.

16. The system for maintaining an optimal airflow within the room of claim 11, additionally comprising:
configuring said user graphic interface to limit said current airflow characteristics said user can input to:
said airborne particle size;
the current temperature within the room;
the position of the light fixture within the room; and
the location of the air flow outlet from the room.

* * * * *